UNITED STATES PATENT OFFICE 2,111,820

ALKYL AROMATIC ACETIC ACID AND HOMOLOGUES THEREOF

Adolf Steindorff and Carl Platz, Frankfort-on-the-Main, and Johann Rosenbach, Wiesbaden, Germany, assignors to I. G. Farbenindustrie Aktiengesellschaft, Frankfort-on-the-Main, Germany No Drawing. Application December 9, 1935, Serial No. 53,674. In Germany December 8, 1934

4 Claims. (Cl. 260—108)

(Granted under the Provisions of Sec. 14, act of March 2, 1927; 357 O. G. 5)

The present invention relates to alkylation products of aromatic acetic acid and homologues thereof.

We have found that several alkyl groups may be introduced in a smooth reaction and with good yields into mono- or poly-nuclear aromatic compounds containing an aliphatic substituent to which at least one hydrophilic group is linked. The smooth introduction of the alkyl groups into the said compounds is surprising. It is particularly remarkable that several alkyl radicals may be introduced with ease into the aforesaid aromatic compounds containing an aliphatic radical, to which at least one hydrophilic group is linked since, as is known, the manufacture of higher alkylated products from, for instance, benzene and benzoic acid causes great difficulties.

As mono- or poly-nuclear bodies, containing aliphatic substituents to which at least one hydrophilic group is linked, there may be used, for instance, the following compounds: phenyl acetic acid, ethylphenylacetic acid, alpha-phenylbutyric acid, hydrocinnamic acid, naphthylacetic acid, acenaphthenylacetic acid, phenylethylalcohol, benzylamine, phenylethylamine; furthermore, mono-benzyl ether of triglycol having the formula:

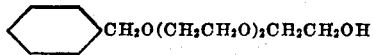

As hydrophilic groups, there may therefore be named, for instance, the following: —OH, —COOH, —NH₂ or mono- or di-substituted amino groups or a quaternary ammonium group, a polyglycol or polyglycerol radical.

As aliphatic radicals to be introduced into the aforesaid aromatic compounds, which radicals may be substituted or interrupted by hetero-atoms, there may be named, for instance: ethyl-, propyl-, isopropyl-, butyl-, isobutyl-, isohexyl-, lauryl-, tertiary butyl-, chlorohexyl-, oxybutyl-, butyl-hydroxyethyl radicals. The aliphatic radicals to be introduced into the aromatic nucleus may be the same or may be different from each other. The following compounds, for instance, are adapted for the alkylation of the above mentioned bodies: propyl-, butyl-, hexyl-, lauryl-, stearyl-, isobutyl alcohols, monobutylglycol or the olefines corresponding to these alcohols such as, for instance, propylene, isobutylene, dodecylene, furthermore their halogen substitution products.

As condensing agents there may be used: sulfuric acid monohydrate, dilute sulfuric acid, oleum, phosphoric acid, borontrifluoride, metal halides and the like.

The condensation of the alcohols or olefines takes place mainly in the aromatic nucleus. In the condensation of phenylacetic acid with butyl alcohol in the presence of sulfuric acid, butylated phenylacetic acids are formed. The process may also be performed, for instance, by treating benzyl alcohol with 3 mols of ethylene oxide and alkylating the mono-benzyl ether of triglycol having the formula:

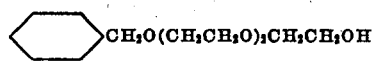

thus formed, or the naphthylacetic acid may be transformed into the polyisohexylnaphthylacetic acid by a treatment with isohexyl alcohol and sulfuric acid.

The condensation products which correspond to the following general formula:

$$(R_1)_n.A.R_2.X$$

wherein A stands for an aromatic ring system,
R₁ means an aliphatic radical,
n means 2 or a higher whole number,
R₂ means an aliphatic radical and wherein
X stands for a hydrophilic group, for instance, OH, COOH, NH₂, or a substituted NH₂-group, for instance, di-, tri- and tetrabutylphenylacetic acid, tetrabutylnaphthylacetic acid, di-isohexyl-hydrocinnamic acid, di-isopropylnaphthylacetic acid, insofar as they contain acid or basic groups, may be transformed into salts or they may be sulfonated by a treatment with sulfuric acid.

The products are particularly valuable as they have properties of capillary activity. They are distinguished by a high wetting and emulsifying action. They have a cleansing power which surpasses that of the alkali salts of higher molecular fatty acids. They may, therefore, be used for all washing and cleansing processes, for instance, for washing white goods, in the textile industry for washing loose wool, for washing piece goods. Some of them, particularly those which contain sulfo-, ester-sulfuric acid, or polyglycolether radicals, have high stability in presence of acids, alkalies and salts that cause the hardness of water, so that they may be used with advantage, for instance, in dye-baths, in carbonizing baths or in kier-boiling.

The products may be used either alone or in admixture with other bodies, for instance, reducing and oxidizing agents, with soaps, salts, solvents or emulsifying stabilizers.

The following examples serve to illustrate the invention, but they are not intended to limit it thereto, the parts being by weight, unless otherwise stated:

(1) 150 parts of sulfuric acid monohydrate are added to 68 parts of phenylacetic acid and warmed, while stirring, to a temperature between 50° C. to 60° C. Thereupon, 148 parts of n-butylalcohol and 300 parts of sulfuric acid monohydrate are caused to run in simultaneously; the whole is then stirred for 12-15 hours. The reaction product is then poured on ice and extracted with ether. The ethereal solution is dried and the ether is evaporated; there is thus obtained a yellow residue which solidifies after some time. The residue has an acid number of 175.1 and a saponification number of 184.8. From the analytical data it may be concluded that the product is a mixture of di- and mainly tri-butylphenylacetic acid. The reaction product may be used, in the form of its sodium salt, as washing agent.

Instead of n-butylalcohol the condensation may also be performed with isohexylalcohol.

(2) 75 parts of hydrocinnamic acid are dissolved in 148 parts of n-butylalcohol. At 50° C. to 60° C. there are caused to run in in the course of one hour, 275 parts of sulfuric acid monohydrate. The whole is then stirred for 7½ hours at 50° C. to 60° C. and for 8 hours at 75° C. to 85° C. The reaction product is then soluble in caustic soda solution to a clear solution. The product may be either directly neutralized or may be purified by way of the calcium salt. The tri-iso-butylhydrocinnamic acid is thus obtained.

By using larger quantities of n-butylalcohol and sulfuric acid monohydrate higher butylated hydrocinnamic acids, for instance, the tetrabutylhydrocinnamic acid, may be obtained.

(3) 75 parts of n-butylalcohol are gradually added, while stirring at 80° C., to a mixture of 93 parts of naphthylacetic acid and 845 parts of sulfuric acid of 80 per cent. strength; the whole is stirred for a further 12 hours at this temperature. The reaction mass is then poured into water and the oil, formed therein, is precipitated. The latter is then neutralized with dilute caustic soda solution and the whole is evaporated to dryness.

(4) 445 parts of delta-phenyl-n-valerianic acid (obtainable by condensing cinnamic aldehyde with malonic acid, hydrogenating and decarboxylating) are dissolved in 560 parts of n-butanol and, at 50° C. to 60° C., 1040 parts of sulfuric acid monohydrate are added in the course of one hour. The whole is then stirred for 15 hours at 65° C., then poured on ice, worked up in the usual manner and saponified. The butylated delta-phenyl-n-valerianic acid obtained has the acid number of 156.0 and a saponification number of 170.2.

(5) In the course of 3 hours there are added, drop by drop while stirring, at 80° C. 500 cc. of sulfuric acid of 80 per cent. strength to a mixture of 93 parts of naphthylacetic acid and 150 parts of n-butanol; the whole is then stirred for a further 15 hours at this temperature. The reaction mass is then poured in water and the oily layer is separated. The latter is neutralized with caustic soda solution and the whole is then evaporated to dryness. The butylated naphthylacetic acid is obtained in the form of a brown powdery mass. The product is distinguished by a good wetting and forming action.

(6) 34 parts of phenylacetic acid are dissolved in 84 parts of n-dodecylene, 18 parts of water are added and at ordinary temperature borontrifluoride is passed through the liquid. The temperature rises slowly to 60° C.; the reaction mass which at first is colorless becomes yellowish-brown. The whole is warmed for 1-2 hours at 65° C. to 75° C., poured on to ice and the upper layer is dissolved in ether. The ethereal solution is washed until neutral, dried and thereupon the ether is evaporated. The residue dissolves, while strongly frothing, in dilute caustic soda solution to a clear solution.

(7) 2 grams of the sodium salt of tetrabutylphenylacetic acid, obtainable by butylation of phenylacetic acid with butyl alcohol and sulfuric acid, are dissolved in 1 liter of water of 5° (German) hardness. A strongly foaming washing liquor is obtained which is very well adapted for cleansing white linen goods.

(8) Sodium polybutylnaphthylacetate, obtainable according to Example 3, is suitable for use as a hot wetting agent. In order to obtain in the washing of wool in neutral distilled water at 45° C. a wetting duration of 2 minutes, according to the floating test (i. e. the wood floats for 2 minutes before it sinks in the liquid), 0.03 gram of the aforesaid product is necessary per liter of washing liquor. In the wetting of cotton in distilled water having an alkaline reaction, there is required at 20° C. 0.4 gram and at 70° 0.07 gram of the aforesaid product per liter of washing liquor.

(9) 2 grams of the sodium salt of delta-tributylphenyl-n-valerianic acid, described in Example 4, are dissolved in 1 liter of water and 2 grams of sodium carbonate are then added. The washing liquor thus prepared is very well adapted for cleansing white linen goods.

(10) 680 parts of phenylacetic acid are dissolved in 2590 parts of n-butanol; at 50° C. to 60° C. there are run in 7800 parts of sulfuric acid monohydrate in the course of 1 hour. The whole is then stirred for 7½ hours at 50° C. to 60° C. and for 8 hours at 65° C. to 70° C. Care must be taken that, after the addition of the monohydrate which entails a stronger reaction, the said temperature is exactly maintained. The product is worked up in a manner similar to that described in Example 1. It has an acid number of 157 and a saponification number of 180. In order to obtain the product in a pure state, it is saponified with aqueous caustic soda solution and is distilled in a vacuum. A product is thus obtained which distils between 184° C. and 190° C. under 3 mm. pressure; its acid number is 179 and its saponification number 184. The reaction product consists for the greater part of tri-iso-butylphenylacetic acid of about the following constitution

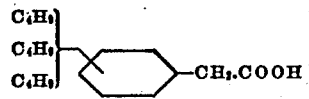

By causing tri-isobutylphenylacetic acid chloride to react with sodium oxethanesulfonate a product of the following constitution is obtained:

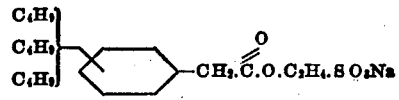

2 grams of this product, in the form of an aqueous solution of 5 per cent. strength, are added to 1 liter of water of 35° (German) hardness. A feebly opalescent solution is obtained which is adapted for wetting and cleansing wool as well as cotton.

(11) By causing tri-isobutylphenylacetic acid chloride (cf. Example 10) to react with the sodium salt of methyltaurine in aqueous alkaline solution according to the Schotten-Baumann reaction a product of the following constitution

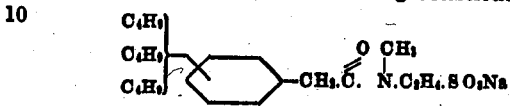

is obtained. The reaction yields even in water of more than 35° (German) hardness clear liquors. 2 grams of this product, dissolved in 1 liter of water, yield a liquor which is adapted for washing goods soiled with mineral and vegetable oils.

(12) 172 parts of benzylsulfonic acid (obtainable by reaction of benzyl chloride with sodium sulfite) are dissolved in 300 parts of propyl alcohol and the whole is then caused to run into 600 parts of concentrated sulfuric acid at 60° C. to 65° C. in the course of one hour. Stirring is continued at 65° C. to 75° C. for about 15 hours. The reaction product is poured on to ice, washed with a sodium chloride solution and neutralized. The sodium salt dissolves very easily in water and forms strongly frothing solutions of high wetting action. It probably has the following compositions:

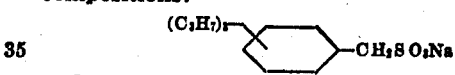

and

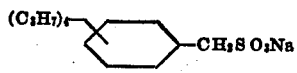

(13) 68 parts of phenylacetic acid are dissolved in 111 parts of n-butanol; at 20° C. to 30° C. borontrifluoride is then passed through the solution in the course of 1–2 hours. The introduction of borontrifluoride is continued for some time at 80° C. to 90° C. and heating is continued until a test portion of the reaction product dissolves in caustic soda solution to a clear solution. The product is then poured on to ice, dissolved in ether and washed with H2O until the washings show no longer an acid reaction to Congo paper. After evaporation of the ether, 130 parts of a polybutylated phenylacetic acid of the acid number 195.3 and a saponification number of 199.2 are obtained. By applying propylalcohol a propylated product is obtained; by using larger quantities of butyl alcohol even higher butylated products may be obtained.

(14) 34 parts of phenylacetic acid are dissolved in 49 parts of isoheptylene; thereupon borontrifluoride is passed in the course of 2 hours through the solution, at first at room temperature and then at 70° C. to 80° C. The whole is then stirred for 15–20 hours at the said temperature. The product is worked up as stated in Example 15.

(15) For washing bed or table linen there may be used the following mixture:

50 parts of the sodium salt of tri-isobutylhydrocinnamic acid, obtainable according to Example 2, of the following formula:

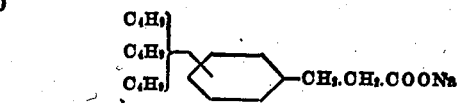

25 parts of calcined sodium carbonate, 10 parts of sodium perborate, 10 parts of sodium pyrophosphate and 5 parts of water glass.

(16) By causing tetra-isobutylhydrocinnamic acid chloride, the preparation of which has been described in Example 2, to react with the potassium salt of methyl taurine in aqueous alkaline solution according to the Schotten-Baumann reaction, a product of the following constitution is obtained:

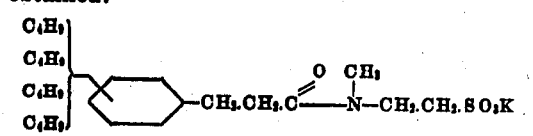

The product may be used in the same manner as that of Example 11.

(17) A wetting agent is the product of the following constitution:

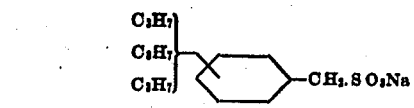

(its manufacture has been described in Example 14).

1 gram of this product, dissolved in 1 liter of water of 35° (German) hardness gives a strongly foaming solution of good wetting power.

(18) 2 mols of isohexylene are caused to react with 1 mol. of phenylethylalcohol in the presence of borontrifluoride. The di-isohexylphenylethylalcohol obtained is transformed by a treatment with sulfonating agents, preferably with aminosulfonic acid, into the ammonium salt of di-isohexylphenylethyl-sulfuric acid of the constitution:

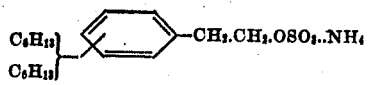

By dissolving 4 parts of this ammonium salt in 100 parts of water, a liquid is obtained which is adapted for kier-boiling.

(19) In a manner similar to that by which the di-isohexylphenylethylalcohol is obtained as described in Example 18, there may be prepared, by starting from propylalcohol and phenylethylalcohol, the (tri- and tetra-isopropylphenyl)-ethylalcohol. In the presence of caustic soda as catalyst 20 gram-molecules of ethylene oxyde are introduced at 115° C. to 120° C. into 1 gram-molecule of tetra-isopropylphenyl)-ethylalcohol. A product of the following constitution is obtained:

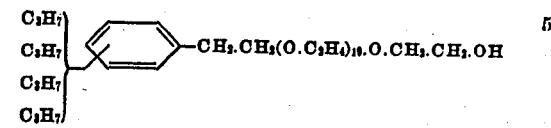

A readily water-soluble compound is obtained. By adding this compound to dye-liquors in the vat-dyestuff industry, much more even dyeings are obtained.

(20) 70 parts of monoethanolamine are added, drop by drop, while stirring in the course of half-an-hour at 60° C. to 70° C. to 304 parts of tri-isobutylphenylacetic acid. The temperature is raised to 115° C. to 120° C. and after some hours to 140° C. to 150° C. Heating is continued until no monoethylamine or only small quantities thereof can be detected by titration by means of

with Congo as indicator, and until free carboxylic acid may no longer be detected by titration by means of $$\frac{N}{10} NaOH$$

with phenolphthaleine as indicator.

The tri-isobutylphenylacetic acid ethanolamide obtained is adapted for stabilizing emulsions.

(21) In the course of half-an-hour 66 parts of phosphorus trichloride are added at 45° C. to 50° C. in a closed apparatus to 300 parts of technical di-isohexylhydrocinnamic acid, with exclusion of atmospheric moisture. Stirring is continued for one hour at 50° C. to 55° C., the whole is allowed to stand for some hours and the bottom layer is then separated. The acid chloride thus obtained is run into an aqueous solution of 10 per cent. strength of 170 parts of sodium aminoethanolsulfate and caustic soda solution is simultaneously added in such a manner that the whole shows always a feebly alkaline reaction to phenolphthaleine. Stirring is continued for some time at 40° C. to 50° C. The reaction product obtained which corresponds to the following formula

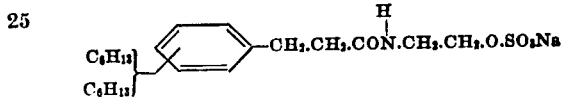

and dissolves in water to a clear solution, is rendered feebly alkaline to litmus paper by means of caustic soda solution.

It may be used as washing agent even in hard water, for instance, for washing raw greasy wool. For this purpose 2–4 parts of the product are dissolved in 1000 parts of water of 12° (German) hardness; raw greasy wool having a fat content of 12 per cent. is washed with this solution for half-an-hour at 40° C. to 50° C.

(22) A product for cleansing household linen is obtained by causing 2 mols of dodecylene to react upon 1 mol. of phenylacetic acid in the presence of borontrifluoride, as described in Example 6. The alkali salts of this condensation product dissolve in water and yield strongly foaming solutions of good washing power.

(23) Ethylene oxyde is introduced at 90° C. to 100° C. into 74 parts of tri-isobutylphenyl acetic acid in the presence of 1 part of caustic soda solution of 46° Bé. As soon as 116 parts of ethylene oxide have been absorbed, the reaction product is soluble in water, to an opalescent solution. Ethylene oxide is again introduced until further 55 parts have been absorbed. The product thus obtained may be used as emulsifying or washing agent.

By a continued introduction of ethylene oxide products are obtained which are extraordinarily soluble in water and may be used as dispersing agent, for instance, for calcium soap or pigments.

An agent for emulsifying, for instance, for neutral oils such as castor oil is obtained by oxethylating tri-isobutylphenylacetic acid with 15 mols of ethylene oxide. 5–10 parts of this product are mixed with 90–95 parts of olive oil. A good emulsion is obtained by pouring the mixture obtained into water. Other oils such as, for instance, turpentine oil or mineral oils may well be emulsified in a similar manner. For the emulsification of oleine it is of advantage to use an oxethylation product containing 20 mols of ethylene oxide.

We claim:

1. The products of the general formula:

$$(R_1)_n.A.R_2.COOH$$

wherein A stands for an aromatic hydrocarbon radical, $R_1$ stands for an aliphatic hydrocarbon radical of at least 3 carbon atoms, $n$ means a whole number higher than 1, $R_2$ means an aliphatic hydrocarbon radical, the products in the form of their water-soluble compounds having capillary activity.

2. The products of the general formula:

$$(R_1)_n.A.CH_2.COOH$$

wherein A stands for an aromatic hydrocarbon radical, $R_1$ stands for an aliphatic hydrocarbon radical of at least 3 carbon atoms, $n$ means a whole number higher than 1, the products in the form of their water-soluble compounds having capillary activity.

3. The products of the general formula:

$$(R_1)_n.(C_6H_{6-(n+1)}).CH_2.COOH$$

wherein $R_1$ stands for an aliphatic hydrocarbon radical of at least 3 carbon atoms, $n$ means a whole number higher than 1, the products in the form of their water-soluble compounds having capillary activity.

4. The products of the general formula:

$$(C_4H_9)_n.C_6H_{6-(n+1)}.CH_2.COOH$$

wherein $n$ stands for a whole number higher than 1, the products in the form of their water-soluble compounds having capillary activity.

ADOLF STEINDORFF.
CARL PLATZ.
JOHANN ROSENBACH.